United States Patent [19]

Lemelson

[11] Patent Number: 5,021,628
[45] Date of Patent: Jun. 4, 1991

[54] APPARATUS AND METHOD FOR REACTING ON MATTER

[76] Inventor: Jerome H. Lemelson, 48 Parkside Dr., Princeton, N.J. 08540

[21] Appl. No.: 372,858

[22] Filed: Jun. 29, 1989

Related U.S. Application Data

[63] Continuation-in-part of Ser. No. 625,197, Jun. 26, 1984, Pat. No. 4,874,596, which is a continuation of Ser. No. 302,644, Sep. 15, 1981, abandoned, which is a continuation-in-part of Ser. No. 110,477, Feb. 10, 1980, abandoned, which is a continuation of Ser. No. 815,692, Jul. 14, 1977, abandoned, which is a continuation of Ser. No. 547,733, Feb. 6, 1975, abandoned, which is a continuation-in-part of Ser. No. 93,779, Nov. 30, 1980, Pat. No. 4,207,154, said Ser. No. 110,477, is a continuation-in-part of Ser. No. 74,388, Sep. 10, 1979, Pat. No. 4,385,880, and a continuation-in-part of Ser. No. 958,514, Nov. 7, 1978, abandoned.

[51] Int. Cl.$^5$ .............................................. B23K 26/00
[52] U.S. Cl. ................... 219/121.6; 219/121.85
[58] Field of Search ........... 219/121.6, 121.85, 121.12, 219/121.35, 121.16, 121.17

[56] References Cited

U.S. PATENT DOCUMENTS

| | | | |
|---|---|---|---|
| 1,968,997 | 8/1934 | Drucker | 219/121.6 X |
| 3,378,446 | 4/1968 | Whittlesey | 219/121.11 X |
| 3,609,283 | 9/1971 | Costello | 219/85.12 |
| 3,949,186 | 4/1976 | Nakayama et al. | 219/121.85 X |
| 4,091,257 | 5/1978 | Anthony et al. | 219/121.12 |
| 4,126,136 | 11/1978 | Auth et al. | 219/121.6 X |
| 4,209,017 | 6/1980 | Shaw | 219/227 X |
| 4,534,811 | 8/1985 | Ainslie et al. | 219/121.85 X |
| 4,595,816 | 6/1986 | Hall et al. | 219/121.85 X |
| 4,627,435 | 12/1986 | Hoskin | 219/233 X |

Primary Examiner—C. L. Albritton

[57] ABSTRACT

An apparatus and method for reacting on matter disposed immediately adjacent a tool by directing a beam of radiation against the tool to react on the material thereof and to transfer energy therefrom to such matter. In one form, the matter is disposed in contact with the tip or end of the tool and the radiation is directed as a beam along a passageway extending to and terminating near the tool tip. The radiation, which may be generated by a laser or an electron gun, is operable to heat the material of the tool and/or generate a shock wave therein, the energy or energies of which may be transferred to the matter in contact with the tool tip. In a particular form, the tool tip is a die employed to compress the matter reacted on wherein a change in the physical characteristics of such matter is effected by the energy of the radiation transmitted through the tool tip to such matter.

32 Claims, 1 Drawing Sheet

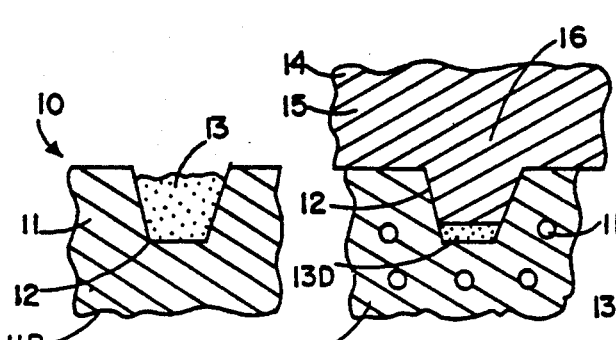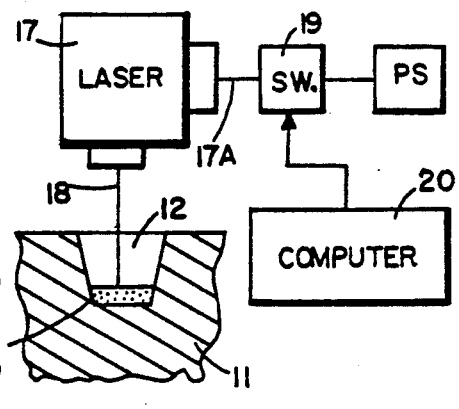
FIG. 1  FIG. 2  FIG. 3
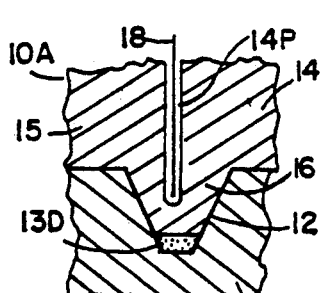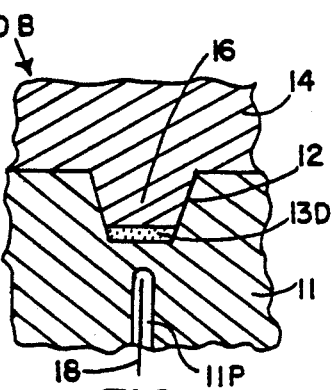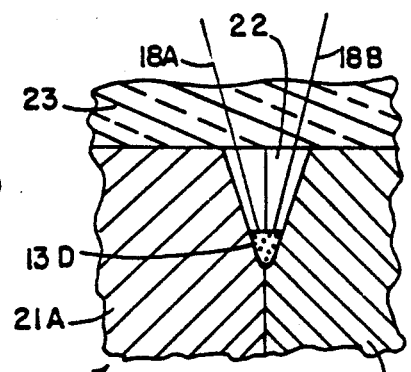
FIG. 4  FIG. 5  FIG. 6
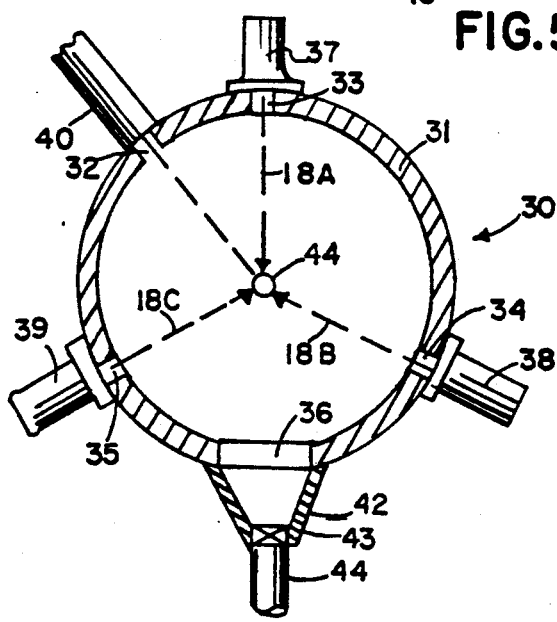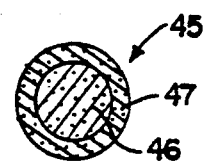
FIG. 7  FIG. 8

APPARATUS AND METHOD FOR REACTING ON MATTER

RELATED APPLICATIONS

This is a continuation-in-part of application Ser. No. 625,197 filed June 26, 1984 now U.S. Pat. No. 4,874,596, a continuation of Ser. No. 302,644 filed Sept. 15, 1981, abandoned, as a continuation-in-part of Ser. No. 110,477 filed Feb. 10, 1980 (abandoned) as a continuation of Ser. No. 815,692 filed July 14, 1977 (abandoned) as a continuation of Ser. No. 547,733 filed Feb. 6, 1975 abandoned as a continuation-in-part of Ser. No. 93,779, filed Nov. 30, 1980 now U.S. Pat. No. 4,207,154. Application Ser. No. 110,477 was also a continuation-in-part of Ser. No. 74,388 filed Sept. 10, 1979 and a continuation-in-part of Ser. No. 958,514 filed Nov. 7, 1978, now abandoned.

BACKGROUND OF THE INVENTION

1. Field of the Invention

This invention is in the field of tools and methods employing same to operate on work or matter wherein radiant energy is applied to the tools and conducted therethrough to their operating portions and then passed to the material of the work to heat soften or otherwise change the physical characteristics thereof.

2. The Prior Art

The prior art discloses apparatus and methods wherein work being turned in a lathe has its portion being cut heated by radiation applied directly thereto. U.S. Pat. No. 2,654,821 entitled HOT MACHINING OF METALS discloses a metal cutting lathe employing an arc from an electrode applied to the face of a metal shaft opposite to that engaged by the tool bit to heat soften the material about to be cut by the tool. U.S. Pat. No. 2,861,166 entitled METHOD AND APPARATUS FOR HOT MACHINING also discloses a lathe having means for directing focused radiation against the opposite side of a shaft being cut by a tool bit as the shaft is rotated for the purpose of heat softening the metal about to be cut.

My U.S. Pat. No. 4,733,049 entitled MACHINING METHOD AND APPARATUS, which was copending with the parent to the instant application, discloses an apparatus and method for machining a portion of work which has been heat softened by a radiation beam.

Depending on the work operation being performed, numerous advantages may be derived in operating on work or matter wherein radiant energy is generated and directed through the material of a tool engaging the work.

SUMMARY OF THE INVENTION

This invention relates to an apparatus and method for reacting on matter located adjacent to a solid material, such as a tip or end portion of a tool or die, by transferring energy to such matter, which energy is transmitted through material of the tool or die from a radiation beam directed against a select portion thereof. In a preferred form of the invention, the radiation is generated as a beam by means of a laser, electron gun or other means and is directed against a select portion of the tool or die, preferably in the vicinity of that portion thereof which engages or is disposed immediately adjacent the matter to be reacted on. A passageway extending through the tool or die may be provided, along which the beam of radiation is directed and caused to intersect the end wall of the passageway for heating and/or generating one or more shock waves in the tool tip in the vicinity of the matter engaged thereby. In a particular form of the invention, the tool or tool tip may compress the matter reacted on against a cooperating surface or die member to shape such matter before and/or after energy is transferred thereto. The laser or electron gun may be pulsed in its operation a select number of times or generated as a single pulse over a select interval of time. In the former mode of operation, each pulse applied to the tool or tool tip material by means of the laser or electron gun, may be operable to generate a respective shock wave therein and/or apply a select amount of heat thereto for heating material adjacent the tool tip by conduction, convection and/or radiation means.

Accordingly it is a primary object of this invention to provide a new and improved apparatus and method for reacting on matter by means of radiation which is conducted to such matter through material of a tool or die.

Another object is to provide an apparatus and method for reacting on matter by means of radiation generated by a laser or electron gun, such radiation being in the form of a narrow beam of collimated light which is directed against a select portion of a tool to controllably heat same and thereby generate heat which may be applied to material located directly adjacent a select portion of the tool.

Another object is to provide an apparatus and method for reacting on matter by means of radiation generated by a laser or electron gun, such radiation being in the form of a narrow beam of collimated light which is directed against a select portion of a tool to controllably heat same and thereby generate heat which may be applied to material located in contact with a select portion of the tool.

Another object is to provide an apparatus and method for reacting on matter by compressively engaging such matter with a portion of a tool and applying heat thereto by heating the tool with a beam of radiation.

Another object is to provide an apparatus and method for reacting on matter with a shock wave generated by an intense radiation beam applied to a tool.

Another object is to provide an apparatus and method for reacting on matter with a plurality of shock waves generated by a pulse radiation beam.

Another object is to provide an apparatus and method for heating the operating portion of a work engaging tool with radiation directed through the tool.

With the above and such other objects in view as may hereafter more fully appear, the invention consists of the novel constructions, combinations arrangements of apparatus parts and methods of their operation as will be more fully described and illustrated in the accompanying drawings, but it is to be understood that changes, variations and modifications may be resorted to which fall within the scope of the invention as claimed.

DESCRIPTION OF THE DRAWINGS

FIG. 1 is a side cross sectional view of a portion of a die containing a predetermined amount of particles of a material such as carbon, to undergo a reaction in the die.

FIG. 2 is a side cross section view of a modified form of the die of FIG. 1 with the particles under compression therein by means of a protruding portion of a second die member which is in forced engagement with the die member containing the particles so as to form a high density pellet of the particles.

FIG. 3 is a side cross sectional view of the die of FIG. 1 containing the pellet of compressed particles, and a laser directing its intense pulse of radiation into the open die and intersecting the pellet.

FIG. 4 is a side cross sectional view of an assembly of die elements of the type illustrated in FIG. 2, wherein a passageway extends through one of the die elements to the protruding portion thereof through which passageway an intense radiation beam is directed.

FIG. 5 is a side cross sectional view of another assembly of die elements wherein a cavity containing die element has a passageway formed therein through which an intense radiant energy beam is passed to heat and generate a shock wave in the die for reacting on matter in the cavity of the die.

FIG. 6 is a side cross sectional view of another assembly of die elements containing a cavity in which a pellet of material is reacted on by radiation which die elements may be split open or separated to open the cavity and facilitate removal of material, which has been reacted on, therefrom.

FIG. 7 is a side cross sectional view of a reaction chamber of spherical shape in which intense radiation beam effected reactions may be effected with respect to particles or pellets of material such as carbon or other material.

FIG. 8 is a side cross sectional view of a pellet of material to be reacted on in a reaction chamber of the type shown in FIG. 7 or a modified form thereof.

The instant invention employs intense radiation in the form of one or more beam or a split beam of intense light such as generated by a laser or one or more electron beams generated by a plurality of electron guns, which radiation is made to intersect either a small quantity of a solid material such as carbon or other material, or a die containing such material in a manner to intensely heat same in such a short period of time as to generate one or more shock waves in such material or die and direct same through the material supported in the cavity of the die to change the physical and, in certain instances, the chemical corporation of such material. Certain features of the instant invention not found in the drawings which may or may not be described hereafter, such as apparatus for handling the reaction material or materials, die handling apparatus and the like, may be found my copending applications described and listed herein under Related Applications and reliance thereon is made for practicing the various embodiments of the invention which are not completely illustrated in the drawings and/or described herein. Where one or more lasers or electron guns are employed to generate high enough intensity radiation beams to perform the material reactions and transformations described, conventional high powered lasers or electron guns or necessary modifications thereof may employed. Exact configurations of dies, die cavities and other devices or components comprising the instant invention will depend on reaction material(s) being used, the quantities thereof employed in each cycle and the intensity of the radiation beam or beams employed in the reaction.

In FIG. 1 is shown a portion of an apparatus 10 including a die 11 made of metal or other suitable material and defining a die base portion 11B containing one or more tapered cavities 12 formed in a surface 13 thereof. Cavity 12 is open at the surface 13A. Disposed in cavity 12 is predetermined quantity of particulate material 13 fed thereto by any suitable means which may completely or partially fill the cavity when it is fed thereto.

In FIG. 2, a second die member 14 is shown brought into assembly with the die member 11 and contains a base portion 15 with a tapered nose or protrusion 16 which extends into the cavity 12 in die member 11 and is used to compress the particulate material 13 to a densified mass 13D within the cavity 12.

In FIG. 3, the die member 14 has been removed from the location illustrated in FIG. 2 exposing the cavity 12 and densified mass of material 13D to a radiation beam 18 generated by a laser or electron gun 17 as a pulse of such radiation when a control 20, such as a computer or programmer, generates an output signal causing the switch 19 to suddenly close and allowing electrical energy to be suddenly transmitted to or discharged through the operating input 17A of the laser or electron gun 17 thereby causing the latter to generate an intense pulse of radiation 18 which is directed against the mass 13D and, in so doing, rapidly heats and creates a shock wave in the compressed material 13D.

If the material 13 comprises particles of suitable carbon material and the intensity and duration of the pulse of radiation 18 is great enough, the heat and shock wave generated and transmitted through the densified material 13D will be sufficient to create one or more diamonds thereof. If materials other than carbon or a mixture of carbon particles with particles of other elements or compounds, are employed to partially fill the cavity 12, material other than diamond or composite materials including diamonds may be formed as described by subjecting the compressed mass thereof to such intense pulse or pulses of radiation directed into the cavity and against such compressed mass.

The apparatus illustrated in FIGS. 1-3 preferably includes a suitable support for die 11 or a plurality of such dies and automatically controlled means for relatively bringing die members 11 and 14 together as shown in FIG. 2 and retracting and removing member 14 from die 11 or the latter from the former and locating die 11 or a support for the laser 17 in alignment with each other to permit the beam 18 of the laser to enter the cavity 12. Such machine components may be made in accordance with teachings found in my U.S. patent application Ser. No. 110,477 filed Jan. 8, 1980.

The apparatus illustrated in FIGS. 1-3 may also include a die containing a plurality of cavities 12 machined or otherwise formed in one or more surfaces thereof which may be fabricated of suitable material adapted to resist destruction or damage caused by the shock waves and temperature transmitted thereto as the machine operates and the radiation beam pass into the cavity during each cycle. Die or dies 11 may thus be supported by a suitable base such as a structural metal member defining a drum, rotary table or support, belt or flight of a belt conveyor, lineally operable device or the like. Suitable means, such as one of the types described or illustrated in said copending patent application Ser. No. 110,477 may be provided for automatically filling the cavity 12 with particulate material to be processed and removing the processed material therefrom after it has been converted to diamond or other material by means of the heat and temperature generated when the intense radiation beam pulse or pulses intersect same as described.

In an alternate form of the invention, one or more intense pulses of radiation may be directed against a select portion of the die 11 and/or die 14, preferably in alignment with or against the tapered portion 16 thereof when the latter is compressively engaging the densified particulate material 13D in the cavity 12. A pulse of such intense radiation directed against, for example, the bottom surface of a cavity or passageway 18 extending through the base 15 of the die 14 from an opening at the upper end thereof, as illustrated in FIG. 4, and generated by a laser or electron gun supported by or above the die 14, may be utilized to both transfer its radiant heat energy to and generate a shockwave in the material of the die, which shock wave will be transmitted along the tapered portion 16 to the densified material 13D compressed by the tapered portion 16 in the cavity 12. Such heat and shock wave may effect a predetermined change in the material 13, such as by converting all or a portion of such material to diamond or other material or composite. Depending on the shape of the tapered portion 16 of the die, the shock wave generated when the pulse of radiation intersects the bottom wall of the bore or passageway 14P extending through the die 14 may be amplified as it reflects off the walls of the tapered portion 16 and may thus be substantially intensified by the time it reaches the bottom surface of the tapered portion 16 and is transmitted therefrom to the densified material 13D. Conversely, one or more bores or passageways extending through the die 11 may also be utilized to receive and transmit one or more pulses of intense radiation therethrough to the material of the die 11 in the immediate vicinity of the cavity 12 for generating one or more intense shock waves in the die 11 which are transmitted to the densified material 13D therein, with or without such materials being engaged and compressed by the tapered portion 16 of die 14. In the latter described machine configuration and operation, the shock wave applied to the material of die 11 may be utilized to both physically change such material and expel the material from the die cavity 12.

In FIG. 4, a die assembly 10A includes a first die member 11 with a tapered cavity 12 formed in a surface thereof and containing a quantity of reaction material 13D compressed by a protruding portion 16 of a second die 14 which is in forced engagement with die 11 as illustrated. The base 15 of die 14 contains an elongated passageway 14P, such as a hole drilled therein from an upper surface (not shown) of the die member 14 above which upper surface is disposed an electron gun or laser similar to the laser 17 of FIG. 3 which directs its intense pulsed radiation beam 18 through the hole or passageway 14P to the bottom row thereof which extends into the protruding portion 16 of die 14. If the beam 18 is generated at sufficient intensity, it will impart a shock wave to the die 14 in the vicinity of the surface which it intersects and such shock wave will travel along the protruding portion 16 to the end thereof and therefrom to and through the compressed pellet 13D of reaction material. If such reaction material comprises a pellet of carbon or graphite, and the shock wave generated and transmitted thereto through the solid die protruding portion 16 is of sufficient intensity, at least a portion, if not all of such carbon material may be converted to diamond in the confined space between the dies. It is noted that the material 13D has been greatly compacted and compressed to a highly densified state, as described, between the die members 14 and 11 and is maintained in such compressed condition therebetween during the period one or more shock waves are transmitted thereto through protruding portion 16.

In FIG. 5, an assembly 10B of die members of the type described and denoted 11 and 14, is provided, wherein the die member 11 contains an elongated passageway or bore 11P extending from a bottom surface thereof (not shown) through which passageway an intense radiation beam is directed to the end wall thereof, which is disposed in direct alignment with the bottom wall of the cavity 12 of the die member 11. A compressed pellet or disc 13D of reaction material, such as carbon, is compressed between the protruding portion 16 of die member 14 and the bottom wall of the cavity 12, as illustrated, and receives one or more intense shock waves generated when the intense pulse of beam radiation 18 intersects the end wall of the passageway 11P, so as to provide intense heat within and force against the compressed material 13D of sufficient intensity to change such material to another form, such as diamond.

In FIG. 6, an assembly 21 of two female die members 21A and 23 is provided, which die members are separable from each other, permitting a small quantity 13D' to be removed from between the split die members after having been reacted on by intense radiation of the type described. Die member 23 of FIG. 6 is a transparent window preferably made of high temperature glass or ceramic material, which is disposed across the tapered cavity 22 formed between the two female die members. A further die member (not shown) is preferably in compressive engagement with the upper surface of window 23 with sufficient force to seal cavity during the reaction phase of the cycle. Two intense radiation beams 18A and 18B are illustrated as directed at an angle to each other through the window 23 into the tapered conical cavity 22 for simultaneously reacting on the small quantity of reaction material disposed in the bottom of such cavity and forming, for example, diamond or other material thereof in the manner described above. Additional radiation beams may also be directed into the cavity in a symmetrical array and focused within or against the upper surface of the pellet 13D' of reaction material to intensely heat and generate a shock wave or waves therein to effect the formation of diamond or other crystalline or non-crystalline material thereof.

It is noted that a high temperature glass or ceramic material may also form part of a male die member, such as member 14 of FIGS. 2 and 5, or define the entire window 23, through which window intense beam or focused beam radiation of the type described may be directed against the compressed pellet of reaction material or carbon disposed between the dies in the assemblies illustrated, rather than directing the laser beam through an open die cavity as illustrated in FIG. 3.

As mentioned above, diamonds and other highly densified materials may be formed of pellets thereof which are directed into a reaction chamber from a supply thereof and, upon reaching a selected location within such chamber, may be intersected by two or more intense radiation beams, preferably although not necessarily simultaneously intersecting a single pellet at the center of the reaction chamber and operable to intensely heat and convert the pellet material to another form, such as diamond. In FIG. 7, such a reaction apparatus 30 is provided which includes a spherical reaction chamber 31, made of stainless steel or other suitable material and having secured to the outer surface of the spherical wall thereof, a plurality of devices including a plurality of lasers, three of which are shown in FIG. 7 and are denoted 37, 38 and 39. Openings or windows 33, 34 and 35 in the wall of the spherical chamber 31 permit intense beam radiation generated by the lasers 37, 38 and 39 respectively to pass therefrom into the reaction chamber. If the lasers are properly aligned, there respective radiation beams 18A, 18B and 18C may be directed along axes such that they will intersect at a predetermined location, such as the center of the spherical volume defined by the spherical chamber 31, and one or more particles or pellets of reaction material, such as carbon, may be supported within or directed to such central portion of the chamber to be simultaneously intersected and reacted on by the plurality of laser beams so as to impart extremely high temperature and the force of the shock waves generated in the pellet or particle by the beams which simultaneously intersect same. If the intense beams of radiation are pulsed and properly directed, each may generate its own shock wave within the pellet, which shock waves converge towards each other intensely compressing and heating the material of the pellet and such intense heat and force may be employed to form one or more diamonds of the material of the pellet.

Notation 40 refers to an elongated chamber disposed across and sealing an opening 32 in the wall of the spherical chamber 31. Located within chamber 40 is a supply of pellets or particles 44 of material to be reacted on and means, such as an electro-mechanical mechanism driven by a motor and operable for mechanically directing pellets, one at a time, into the chamber from the end of housing 40 or releasing a high velocity pressurized gas as a stream for carrying one or more pellets thereon into chamber 31 to the central location thereof defining the intersection of the axes of the beams of the lasers 37, 38 and 39.

The operation of the apparatus of FIG. 7 may be effected under the control of a master controller or computer wherein precise timing is employed to control the ejection of the pellet into the chamber and the simultaneous generation of the pulses of intense beam radiation by the lasers 37, 38 and 39. It is also noted that a single laser may be employed with the intense beam thereof split into three or more separate beam by suitable mirrors and other optical devices and directed by such devices through respective windows or openings in the chamber 31 to the described focal location thereof when the reaction material or pellet has reached such location. A feedback control system, of the type described in my copending application entitled, "Reaction Apparatus and Method," may be utilized in FIG. 7 and employing a photoelectric detector for detecting the pellet 44 when it reaches the focal location within the reaction chamber, which detector generates a control signal which controls the operation of the one or more lasers or electron guns directed their intense beam energy into the reaction chamber.

Also illustrated in FIG. 7 is an opening 36 in the bottom portion of the wall of the spherical reaction chamber 31 through which opening may fall material which has been reacted on by the intense radiation beams and may be collected in a tapered hopper 42 which is sealed to the wall of the chamber across the opening and fed therefrom, either individually or collectively, through a valve 43 to an exit duct or pipe 44.

In FIG. 8 is shown a modified form of pellet for use in a reaction chamber of the type illustrated in FIG. 7 or a modified form thereof. The pellet 45 includes a core portion 46 of reaction material, such as carbon or other material to be converted by high temperature and shock waves, to diamond or other material. Completely surrounding and forming a shell on the outer surface of the spherical pellet 46 is a coating of frozen tritium-deuterium which is capable of partaking in a thermonuclear fusion reaction when intersected from a plurality of directions by a plurality of intense laser beams. The resulting fusion reaction generates intense heat and pressure which is applied to the core material 46 and is operable to transform or change such material to another form, such as diamond or diamonds. A plurality of pellets 45 of the type illustrated in FIG. 8 may be individually fed in sequence to a reaction chamber of the type shown in FIG. 7 and each simultaneously intersected by a plurality of intense pulsed radiation beams for effecting thermonuclear fusion of the fusion material 47 surrounding the core 46 of the composite pellet.

Depending on the reaction material employed, the intensity of the radiation beam or beams employed and the physical change(s) desired in the material(s) reacted on, the quantity of the carbon or other reaction material employed in pellet or particle form changed into the die may vary from an order of a few milligrams to one or more grams thereof and the shell of thermonuclear fusion material, such as frozen tritium-deuterium, may also vary from milligram to gram quantities. The described reaction may take place in a die cavity or plural die cavities or in the reaction chamber in a vacuum or predetermined atmosphere such as a vapor or gaseous atmosphere, which may or may not partake in the reaction at atmospheric or high ambient pressure.

Additional variations in the machinery described above include the following:

1. Control 20 for the laser or electron beam 17 may comprise a computer or programming device which is also operable to control apparatus for filling cavity or cavities 12 of the die 11 with particulate material to be processed, relative movement between dies 11 and 14 and an apparatus for removing processed material from one or more cavities 12 formed in die 11 or a plurality of such dies supported by a common base.

2. Particles of material to be combined with the material in the die 12 may be introduced into the cavity or beam 18 as it is directed into the cavity and implanted, welded or otherwise combined with the material in the cavity by means of the heat and shock wave force applied thereto.

3. If the die 14 is replaced by a machine component or other article, the densified material 13D may not only be physically changed in structure but may also be bonded or welded to the surface of die portion 16 which engages same, by means of the intense heat generated when the intense radiation beam is directed through the passageway 14P extending to the vicinity of the die portion 16 illustrated, for example, in FIG. 4. Cutting tools, dies and other composite devices may be fabricated by such means. It is also noted that the material in the die may be welded to the base of the cavity 12 and retained therein by the means illustrated in FIG. 3. Such retention may be such as to provide a composite article, such as a die or other device formed of the processed material and at least a portion of the die 11 or may be retained only for further processing in the die cavity after which it is removed. In the embodiment in which the material is welded to the end of protruding die portion 16, such welding may be utilized only to remove the material from the cavity when the die 14 is separated from due 11 whereafter the material may be removed from the end of die portion 16 or retained thereon for further processing.

4. In a modified form of the apparatus 10A shown in FIG. 4, the nose or tapered portion 16 of the tool or die member 14 may serve to compress, heat, react on and bond the material 13D to member 11, which, although it acts as a die, may also comprise a unit of work to be formed into a composite material with the material compressed thereagainst and reacted on as described above. Such bonding may be effected by the force and heat of the shockwave generated by the radiation beam 18 generated in the material of the tapered portion 16 and/or by means of heat transferred from the radiation beam to the material of portion 16 and conducted therethrough to the material 13D. Similarly, one or more shock wave and/or heat generated by one or more pulses of radiant energy defined by beam 18 of FIG. 5 may also be employed to react on, change and weld or bond material 13D thereof to either member 11 or member 14.

5. As indicated above, the nose or tapered portion 16 of the tool or die 14 may form part of a cutting tool, such as a cutting edge defining portion thereof which is heated by means of the beam of radiation directed thereto along passageway 14P, wherein such heating employed to heat the material of the work engaged by such tool, for the purpose of improving the operation of the tool and/or reacting on the material being cut. For example, if the tool is a surgical tool employed to cut tissue in a surgical operation, the heat applied by means of beam 18 of FIG. 4 to the surgical tool cutting blade or operating portion 16 may be employed to corterize or otherwise beneficially affect the cut or injured tissue.

6. If the tapered portion 16 of the tool 14 of FIG. 4 defines one or more cutting edges of a cutting tool or a support to hard material 13D, such as diamond or other hard solid matter, bonded or welded thereto which hard material defines one or more cutting edges, then the cutting edge portion or portions thereof may be heated, as described, by means of radiant energy transferred through the passageway 14P as a narrow beam of laser or electron radiation, so as to improve the cutting action by heating the material being cut or to corterize living tissue cut by the cutting tool.

7. A material processing device made in accordance with the structures and teachings of FIGS. 4 and 5 may be used to primarily compress and/or heat matter adjacent a select portion of such device for the purpose of both physically and chemically changing such matter in a predetermined manner as a result of the heat transferred, as described above, to such matter or a combination of heat and one or more shock waves generated and conducted through the device or tool.

8. If the nose or tip portion 16 of the embodiment of FIG. 4 is shaped with a cutting edge, such cutting edge portion may be rapidly heated by the beam 18 of radiation directed through passageway 14P to the vicinity of the cutting edge portion of the tool by conduction. Such heat may then be passed from the cutting edge portion of the tool to work matter which it is cutting to soften or otherwise controllably affect same in a cooperative action with the tool.

9. The tool 14 may also be modified in shape and may comprising either the operating head of a catheter or a portion thereof operable to transfer shock waves and/or radiant energy in the form of heat to matter adjacent thereto when the catheter is disposed in a body duct or tissue. The heat transferred may be used to coagulate blood. Shock waves so generated and passed through such operating head as described may be employed to dissipate or break up blood clots and/or other solid matter constricting a blood vessel or other body duct in which the catheter is disposed or in an adjacent body duct.

10. In addition of solid material or particles disposed to be operated on by the direct and/or indirect effects of the radiation beam or beams of FIGS. 3-7, matter which is subjected to the heat and shock waves generated as described may also be in liquid and/or gaseous state disposed in or adjacent the die or dies or chamber 31.

What is claimed is:

1. A method for reacting on matter comprising:
  (a) generating an intense radiation beam,
  (b) directing said intense radiation beam against a select portion of a tool engaging matter located immediately adjacent said tool, wherein energy of said radiation is conducted through said select portion of said tool and has an intensity sufficient to heat said tool and said matter and to change the physical characteristics of said matter.

2. A method for reacting on matter comprising:
  (a) generating an intense radiation beam of collimated light energy by energizing a laser,
  (b) directing said intense radiation beam against a select portion of a tool and transmitting a portion of the energy of the radiation of said beam to and through select material of said tool to matter located immediately adjacent said tool in a manner to change the physical characteristics of said matter.

3. A method for reacting on matter comprising:
  (a) generating an intense radiation beam, and
  (b) directing said intense radiation beam along a passageway extending through a first portion of a tool before intersecting a select portion of said tool and transmitting a portion of the energy of the radiation of said beam to and through select material of said tool to matter located immediately adjacent said tool in manner to change the physical characteristics of said matter.

4. A method for reacting on matter comprising:
  (a) generating an intense radiation beam, and
  (b) directing said intense radiation beam against a select portion of a tool and transmitting a portion of the radiation of said beam to and through select material of said tool to matter located immediately adjacent said tool to change the physical characteristics of said matter by applying energy of said beam to generate a shock wave in said matter and operating on said matter with said shock wave.

5. A method in accordance with claim 1 wherein said radiation beam is operable to controllably heat a select portion of said tool located adjacent said matter and to effect the transfer of the energy of said radiation beam through the material of said tool to said matter.

6. A method for reacting on matter comprising:
  (a) generating intense radiation as an electron beam,
  (b) directing said beam against a select portion of a tool and transmitting a portion of the energy of the radiation of said beam to and through select material of said tool to matter located immediately adjacent said tool in a manner to change the physical characteristics of said matter.

7. A method in accordance with claim 1 wherein said tool compressively engages said matter during its operation thereon including the time interval energy is transferred from said radiation to said matter.

8. A method for reacting on matter comprising:
 (a) generating an intense radiation beam;
 (b) directing said intense radiation beam against a select portion of a tool and transmitting a portion of the energy of the radiation of said beam to and through select material of said tool to matter located immediately adjacent said tool; and
 (c) pulsing said radiation beam in a manner to generate a shock wave in the material of said tool wherein said shock wave is transmitted through said tool to said matter.

9. A method in accordance with claim 8 wherein said radiation is operable to generate a plurality of shock waves in the material of said tool which plurality of shock waves are transmitted to said matter.

10. An apparatus for reacting on matter comprising in combination:
 (a) a tool having an operating portion operable to engage matter to be operated on by said tool,
 (b) means for generating a radiation beam,
 (c) means for directing said radiation beam against a select portion of said tool and transferring radiant energy of said beam through material of said tool whereby said radiant energy is conducted through said operating portion of said tool to matter located adjacent said tool,
 (d) means for operating said radiation beam generating means to cause it to generate radiation of sufficient intensity such that, when said radiation is conducted through the material of said tool to said matter, a select change in the physical characteristics of said matter will be effected by the energy of the radiation transmitted primarily through said tool to said matter.

11. An apparatus for reacting on matter comprising in combination:
 (a) a tool having an operating portion operable to engage matter to be operated on by said tool,
 (b) means for generating a radiation beam,
 (c) means for directing said radiation beam against a select portion of said tool and transferring energy of said beam through material of said tool whereby said energy is conducted through said operating portion of said tool to matter located adjacent said tool,
 (d) means for operating said radiation beam generating means to cause it to generate radiation of sufficient intensity such that, when said radiation is directed against said tool and energy of said radiation is transmitted to a select portion of said tool portion will be heated by the radiation it receives, and
 (e) said tool further having a passageway extending there-through, means for directing said radiation beam along said passageway and means located at the end of said passageway for receiving said beam and conducting heat energy of said radiation to and through the operating portion of said tool.

12. An apparatus for reacting on matter comprising in combination:
 (a) a tool having an operating portion operable to engage matter to be operated by said tool,
 (b) means for generating a radiation beam,
 (c) means for directing said radiation beam against a select portion of said tool and transferring radiant energy of said beam through material of said tool whereby said radiant energy is conducted through said operating portion of said tool to matter located against said tool,
 (d) means for operating said radiation beam generating means to cause it to generate radiation of sufficient intensity such that, when said radiation is conducted through the material of said tool to said matter, a select change in the physical characteristics of said matter will be effected by the radiation transmitted through said tool to said matter, and
 (e) means for pulsing said radiation beam a number of times to cause it to intermittently intersect a receiving means at the end of a passageway extending through a select portion of said tool.

13. An apparatus in accordance with claim 12 wherein said means for generating said radiation beam is operable to generate said beam at sufficient intensity to cause said radiation to generate a shock wave in the material of said tool in a manner to cause said shock wave to be transmitted through the material of said tool to matter adjacent said operating portion of said tool and to react thereon.

14. An apparatus in accordance with claim 12 wherein said means for generating said radiation beam is operable to generate said beam at sufficient intensity to cause it to generate a plurality of shock waves in the material of said tool which shock waves are transmitted to matter adjacent said tool.

15. An apparatus for reacting on matter comprising in combination:
 (a) a tool having an operating portion operable to engage matter to be operated on said tool,
 (b) means for generating a radiation beam,
 (c) means for directing said radiation beam against a select portion of said tool and transferring radiant energy of said beam through material of said tool whereby said radiant energy is conducted through said operating portion of said tool to matter located adjacent said tool,
 (d) means for operating said radiation beam generating means to cause it to generate radiation of sufficient intensity such that, when said radiation is conducted through the material of said tool to said matter, a select change in the physical characteristics of said matter will be effected by the radiation transmitted through said tool to said matter, and
 (e) said tool comprises a die means and a cooperating die means and means operable to compress material adjacent said tool between said die means and said cooperating die means.

16. An apparatus for reacting on matter comprising in combination:
 (a) a tool having an operating portion operable to engage matter to be operated on by said tool,
 (b) means for generating a radiation beam,
 (c) means for directing said radiation beam against a select portion of said tool and transferring radiant energy of said beam through material of said tool whereby said radiation energy is conducted through said operating portion of said tool to matter located adjacent said tool,
 (d) means for operating said radiation beam generating means to cause it to generate radiation of sufficient intensity such that, when said radiation is conducted through the material of said tool to said matter, a select change in the physical characteristics of said matter will be effected by the radiation transmitted through said tool to said matter, and (e) including means for operating said tool to cause it to compress matter adjacent said tool, and a computer operable to control the operation of said means for generating radiation.

17. A method for reacting on matter comprising:
(a) generating focused radiation,
(b) applying said focused radiation solely to a select portion of a tool,
(c) generating heat energy in said tool by means of said radiation applied to said select portion of said tool,
(d) conducting said heat energy generated in said tool to an operating portion of said tool, which operating portion is in engagement with matter to be operated on by said tool, and
(e) passing heat energy to matter engaged by said tool so as to effect a physical change in said matter by heat energy conducted solely through said tool to the operating portion of said tool.

18. A method for reacting on matter comprising:
(a) generating radiation,
(b) applying said radiation to a select portion of a tool,
(c) generating heat energy in said tool by means of said radiation applied to said select portion of said tool,
(d) conducting said heat energy generated in said tool to an operating portion of said tool, which operating portion is in engagement with matter to be operated on by said tool,
(e) passing heat energy conducted through said tool to said operating portion of said tool to matter engaged by said tool so as to effect a physical change in said matter, and
(f) wherein said tool is a die operable to shape material, said method including heating an operating portion of said die with said radiation generated and applied to said select portion of said tool while it is in engagement with matter so as to transfer heat through said die to said matter during the shaping of said matter with said die.

19. A method for reacting on matter comprising:
(a) generating radiation as a beam from a point source,
(b) applying said radiation to a select portion of a tool,
(c) generating heat energy in said tool by means of said radiation applied to said select portion of said tool,
(d) conducting said heat energy generated in said tool to an operating portion of said tool, which operating portion is in engagement with matter to be operated by said tool, and
(e) passing heat energy conducted through said tool to said operating portion of said tool to matter engaged by said tool so as to effect a physical change in said matter.

20. A method in accordance with claim 19 wherein said beam of radiation is a collimated beam of laser radiation adjacent the portion of said tool engaging said matter to be operated on.

21. A method for reacting on matter comprising:
(a) generating at a point source a beam of intense collimated radiation,
(b) directing said collimated radiation beam against an operating end of an elongated tool in a manner to predeterminately heat said operating end of said tool to the exclusion of the remaining portion of said tool,
(c) applying said operating end of said tool to matter to be operated on, and
(d) transmitting heat from the heated operating end of said tool to select matter to which said operating end is applied to cause said tool to selectively heat and operate on said matter.

22. A method in accordance with claim 21 wherein said operating end of said tool terminates an elongated visible light conducting portion of said tool and said radiation is directed along said light conducting portion of said tool to said operating end.

23. A method in accordance with claim 22 wherein said collimated radiation is directed from one end of said light conducting portion of said tool to the other end thereof to intersect and heat said operating end of said tool.

24. A method in accordance with claim 22 wherein said collimated radiation is generated as a laser beam.

25. A method for operating on matter comprising:
(a) generating intense radiation from a point source,
(b) directing said intense radiation against an operating head of a tool to cause said radiation to heat the material of said head,
(c) applying said operating head to a select portion of matter, and
(d) transferring heat from the heated head of said tool to said select portion of said matter.

26. A method for operating on matter comprising:
(a) generating intense radiation,
(b) providing an elongated tool having opposite end portions, one end portion facing the generated radiation and the other end portion facing select matter to be operated on,
(c) directing said intense radiation axially along one end portion of said elongated tool to the other end portion thereof to cause said other tool end portion to become heated by said radiation,
(d) applying said heated end portion of said tool to select matter, and
(e) operating on said select matter by transferring heat from the heated end of said tool to said select matter.

27. A method in accordance with claim 26 wherein said intense radiation is generated as a narrow beam and is directed along a longitudinal axis extending through said tool against a select portion of said operating head of said tool to heat and select portion of said operating head.

28. A method for reacting on matter comprising:
(a) generating an intense radiation beam,
(b) providing a tool having an elongated visible light transmitting portion and solid material disposed at an end of the elongated portion,
(c) directing said intense radiation beams axially through said elongated light transmitting portion, and
(d) applying a portion of the energy of the radiation beam to heat the solid material at the end of said tool and matter located immediately adjacent said tool end in a manner to change the physical characteristics of said matter.

29. An apparatus for reacting on matter comprising in combination:
(a) a tool having an operating portion operable to engage matter to be operated by said tool, and a passageway extending to said operating portion, (b) means for generating a radiation beam, (c) means for directing said radiation beam along said passageway to intersect said operating portion of said tool, and transferring energy of said beam through the material of said tool defining said operating portion of said tool to matter located against said operating portion of said tool, (d) means for operating said radiation beam generating means to cause it to generate radiation of sufficient intensity such that, when said radiation is conducted through the material of said tool to said matter, a select change in the physical characteristics of said matter will be effected by the energy transmitted through said tool to said matter, and (e) means for pulsing said radiation beam a number of times to cause it to intermittently intersect said operating portion at the end of said passageway.

30. An apparatus for reacting on matter comprising in combination:

(a) a tool having an operating portion operable to engage matter to be operated on said tool, (b) means for generating a radiation beam, (c) means for directing said radiation beam against a select portion of said tool and transferring energy of said beam through material of said tool whereby said energy is conducted through said operating portion of said tool to matter located adjacent said tool and (d) means for operating said radiation beam generating means to cause it to generate radiation of sufficient intensity such that, when said radiation is conducted through the material of said tool to said matter, a select change in the physical characteristics of said matter will be effected by the energy of said radiation transmitted through said tool to said matter, and (e) said tool comprising cooperating die means and means operable to compress material adjacent said tool.

31. An apparatus for reacting on matter comprising in combination:

(a) a tool having an operating portion for engaging matter to be operated on by said tool, (b) means for generating a radiation beam, (c) means for directing said radiation beam against a select portion of said tool and transferring energy of said beam through material of said tool whereby said energy is conducted through said operating portion of said tool to matter located adjacent said tool, (d) means for operating said radiation beam generating means to cause it to generate radiation of sufficient intensity such that, when energy of said radiation is conducted through the material of said tool to said matter, a select change in the physical characteristics of said matter will be effected by the radiation transmitted through said tool, (e) means for causing said tool to compress matter adjacent said tool, and (f) a computer operable to control the operation of said means for generating radiation.

32. A method for reacting on matter comprising:

(a) generating radiation, (b) applying said radiation to a select portion of a tool including a die operable to shape material (c) generating heat energy in said tool by means of said radiation applied to said select portion of said tool, (d) conducting said heat energy in said tool to an operating portion of said tool, which operating portion is in engagement with matter to be operated on by said tool, (e) passing heat energy conducted through said tool to said operating portion of said tool to matter engaged by said tool so as to effect a physical change in said matter, and (f) heating an operating portion of said die with said radiation while said operating portion is in engagement with matter so as to transfer heat through said die to said matter during shaping of said matter with said die.

* * * * *